United States Patent
Maeda et al.

(10) Patent No.: US 7,133,580 B2
(45) Date of Patent: Nov. 7, 2006

(54) OPTICAL WAVEGUIDE DEVICE AND MANUFACTURING METHOD THEREFOR

(75) Inventors: Akio Maeda, Kawasaki (JP); Takashi Shiotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 10/699,696

(22) Filed: Nov. 4, 2003

(65) Prior Publication Data
US 2004/0096138 A1    May 20, 2004

(30) Foreign Application Priority Data
Nov. 19, 2002   (JP) .............................. 2002-335151

(51) Int. Cl.
G02F 1/295    (2006.01)
G02B 6/12    (2006.01)
G02B 6/26    (2006.01)

(52) U.S. Cl. .............................. 385/8; 385/14; 385/15; 385/27

(58) Field of Classification Search ................... 385/8, 385/14, 15, 27
See application file for complete search history.

(56) References Cited

U.S. PATENT DOCUMENTS

| | | | |
|---|---|---|---|
| 4,750,799 A  * | 6/1988 | Kawachi et al. .............. | 385/14 |
| 5,764,832 A  * | 6/1998 | Tabuchi ....................... | 385/49 |
| 6,108,464 A  * | 8/2000 | Foresi et al. .................. | 385/14 |
| 6,706,546 B1 * | 3/2004 | Yoshimura et al. ........... | 438/31 |
| 2002/0039464 A1* | 4/2002 | Yoshimura et al. ........... | 385/14 |
| 2002/0097962 A1* | 7/2002 | Yoshimura et al. ........... | 385/50 |
| 2004/0037497 A1* | 2/2004 | Lee ............................. | 385/28 |

FOREIGN PATENT DOCUMENTS

| | | |
|---|---|---|
| JP | 03-202810 | 9/1991 |
| JP | 10-104559 | 4/1998 |
| JP | 2001-284324 | 10/2001 |

* cited by examiner

Primary Examiner—Kianni Kaveh
(74) Attorney, Agent, or Firm—Staas & Halsey LLP

(57) ABSTRACT

A manufacturing method for an optical waveguide device. The manufacturing method includes the steps of forming an optical waveguide in a substrate having an electro-optic effect, forming an $SiO_2$ film on the substrate, forming Si films on the $SiO_2$ film, the lower surface of the substrate, and at least a part of the side surface of the substrate to thereby make a conduction between the Si film formed on the $SiO_2$ film and the Si film formed on the lower surface of the substrate. The manufacturing method further includes the steps of applying a photoresist to the Si film formed on the $SiO_2$ film, patterning the photoresist so that a portion of the photoresist corresponding to the optical waveguide is left, forming a groove on the substrate along the optical waveguide by reactive ion etching, and removing the photoresist and the Si films.

4 Claims, 12 Drawing Sheets

OPTICAL WAVEGUIDE DEVICE AND MANUFACTURING METHOD THEREFOR

BACKGROUND OF THE INVENTION

1. Field of the Invention

The present invention relates to an optical waveguide device and a manufacturing method therefor.

2. Description of the Related Art

An optical device using an optical waveguide has increased in necessity with the evolution of optical communication, and it is used as an optical modulator, optical demultiplexers, optical switch, or optical wavelength converter, for example. Known examples of the optical waveguide include an optical waveguide formed by diffusing titanium (Ti) in a $LiNbO_3$ crystal substrate, an optical waveguide formed by depositing $SiO_2$ on an silicon (Si) Si substrate, and a polymer optical waveguide. As a practical external modulator, a Mach-Zehnder type optical modulator (LN modulator) using a dielectric crystal substrate such as a lithium niobate ($LiNbO_3$) crystal substrate has been developed. Carrier light having a constant intensity from a light source is supplied to the LN modulator to obtain an optical signal intensity-modulated by a switching operation using the interference of light.

The LN modulator includes a dielectric substrate formed from a Z-cut lithium niobate crystal, a pair of optical waveguides formed in the upper surface of the substrate by thermally diffusing titanium (Ti) in the substrate to thereby increase a refractive index, these optical waveguides being combined together near their opposite ends, an $SiO_2$ buffer layer formed on each optical waveguide, and a signal electrode (traveling wave electrode) and a grounding electrode formed on the buffer layers so as to respectively correspond to these optical waveguides. Signal light input from one end of the combined optical waveguides is split at one junction thereof to propagate in the optical waveguides. When a drive voltage is applied to the signal electrode formed over one of the optical waveguides, a phase difference is produced between the split signal lights propagating in the optical waveguides by an electro-optic effect.

In the LN modulator, these signal lights are recombined to be taken out as optical signal outputs. By applying the drive voltage so that the phase difference between the signal lights propagating in the two optical waveguides becomes 0 or $\pi$, an on/off pulse signal can be obtained. As a recent LN modulator, the development of a modulator having a high-frequency band of 40 Gb/s has been pursued to realize a higher modulation rate. To reduce a propagation loss and ensure a high-frequency band characteristic in the above-mentioned high-frequency band, it is indispensable to form a groove having a depth of several micrometers between the electrodes along the optical waveguides in the LN modulator. This groove is formed usually by using an RIE (reactive ion etching) dry etching device.

The conventional technique of forming the groove by using the RIE dry etching device has the following problems.

(1) The LN substrate as the base of the LN modulator is a ferroelectric member, so that polarization due to temperature fluctuations occurs and when an electric field on one surface of the substrate reaches about 6,000 V, discharging occurs to cause the damage to a wafer due to discharge shock. In particular, when a sudden temperature change (5° C./min or more) occurs, the damage to the wafer becomes remarkable. The RIE device for use in forming the groove as mentioned above employs a high-frequency power supply, which causes a sudden temperature change to the wafer. As a result, the damage to the wafer easily occurs to cause a reduction in yield.

(2) The RIE device is divided into a load lock chamber (loading chamber) for setting the wafer or taking it out and an etching chamber for actually performing RIE. The wafer is automatically transferred between the load lock chamber and the etching chamber. However, since the LN wafer exhibits a pyroelectric effect, it tends to stick to a metallic member. In a conventional manufacturing method for an LN modulator, the LN wafer sticks to a stage (aluminum electrode) provided in the etching chamber after etching of the LN wafer, so that the wafer cannot be automatically transferred to the load lock chamber.

Accordingly, every time the etching step is ended, the etching chamber is disassembled and a sharp member such as a razor blade is inserted between the wafer and the stage to forcibly separate the wafer from the stage. However, this wafer separating work may easily cause the damage to the wafer, thus remarkably reducing the yield. Further, the etching chamber disassembling work includes a dangerous operation of opening a breaker for the high-frequency power supply and manually disconnecting a signal line. Further, a cooling water pipe, gas induction pipe, etc. must be disconnected, causing a danger and trouble. Further, in reassembling the etching chamber, it is necessary to ensure the assembly accuracy of a wafer chucker, and even if there is a fine positioning error, gas leak occurs to result in generation of a temperature distribution in the LN wafer, thus leading to the damage to the wafer.

(3) In the RIE dry etching, a photoresist is used as a mask, and the LN wafer with the photoresist is etched. At a high temperature (120° C. or higher), the photoresist is erosively burned and oxidized. To prevent this problem, the wafer is cooled through the stage and maintained at a low temperature. Accordingly, a temperature difference is produced between the upper and lower surfaces of the wafer, thus leading to the damage to the wafer.

(4) In the step of patterning exposure of the photoresist for the RIE dry etching, the wafer and a glass mask are aligned. This alignment must be performed with accuracy of 2 μm or less, so as to ensure necessary characteristics. However, since the LN wafer itself is transparent, the luminance at the time of exposure lacks and an alignment marker cannot therefore be viewed, causing a pattern deviation. If the pattern deviation arises, the photoresist must be applied and patterned again, causing a reduction in nonadjusted ratio and a reduction in yield.

SUMMARY OF THE INVENTION

It is therefore an object of the present invention to provide a manufacturing method for an optical waveguide device which can prevent the damage to the wafer in the RIE dry etching step and allows automatic transfer of the wafer.

It is another object of the present invention to provide an optical waveguide device having an excellent high-frequency characteristic.

In accordance with an aspect of the present invention, there is provided a manufacturing method for an optical waveguide device, including the steps of forming an optical waveguide in a substrate having an electro-optic effect; forming an $SiO_2$ film on the substrate; forming Si films on the $SiO_2$ film, the lower surface of the substrate, and at least a part of the side surface of the substrate to thereby make a conduction between the Si film formed on the $SiO_2$ film and the Si film formed on the lower surface of the substrate;

applying a photoresist to the Si film formed on the SiO$_2$ film; patterning the photoresist so that a portion of the photoresist corresponding to the optical waveguide is left; forming a groove on the substrate along the optical waveguide by reactive ion etching; and removing the photoresist and the Si films.

Preferably, the substrate includes a LiNbO$_3$ substrate, and the step of forming the optical waveguide includes the step of thermally diffusing Ti in the LiNbO$_3$ substrate. For example, the step of forming the Si films is performed by sputtering. Preferably, the photoresist includes a conductive photoresist.

In accordance with another aspect of the present invention, there is provided a manufacturing method for an optical waveguide device, including the steps of forming an optical waveguide in a substrate having an electro-optic effect; forming an SiO$_2$ film on the substrate; forming Ti films on the SiO$_2$ film, the lower surface of the substrate, and at least a part of the side surface of the substrate to thereby make a conduction between the Ti film formed on the SiO$_2$ film and the Ti film formed on the lower surface of the substrate; applying a photoresist to the Ti film formed on the SiO$_2$ film; patterning the photoresist so that a portion of the photoresist corresponding to the optical waveguide is left; forming a groove on the substrate along the optical waveguide by reactive ion etching; and removing the photoresist and the Ti films.

In accordance with a further aspect of the present invention, there is provided an optical waveguide device including a substrate having an electro-optic effect; an optical waveguide formed in the substrate; a signal electrode formed in relation to the optical waveguide; a grounding electrode formed on the substrate; a groove formed on the substrate along the optical waveguide; an SiO$_2$ buffer layer formed on the substrate except the groove; and an Si film formed on the SiO$_2$ buffer layer, the inner surface of the groove, the lower surface of the substrate, and at least a part of the side surface of the substrate.

In accordance with a still further aspect of the present invention, there is provided an optical modulator including a substrate having an electro-optic effect; an optical waveguide structure having an input waveguide formed in the substrate, an output waveguide formed in the substrate, and first and second waveguides extending between the input waveguide and the output waveguide, the first and second waveguides being connected to the input and output waveguides, respectively; a signal electrode formed over the first waveguide; a first grounding electrode formed over the second waveguide; a second grounding electrode formed over the substrate at a position opposite to the first grounding electrode with respect to the signal electrode; a first groove formed on the substrate along the first waveguide; a second groove formed on the substrate along the second waveguide; an SiO$_2$ buffer layer formed on the substrate except the first and second grooves; and an Si film formed on the SiO$_2$ buffer layer, the inner surfaces of the first and second grooves, the lower surface of the substrate, and at least a part of the side surface of the substrate.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
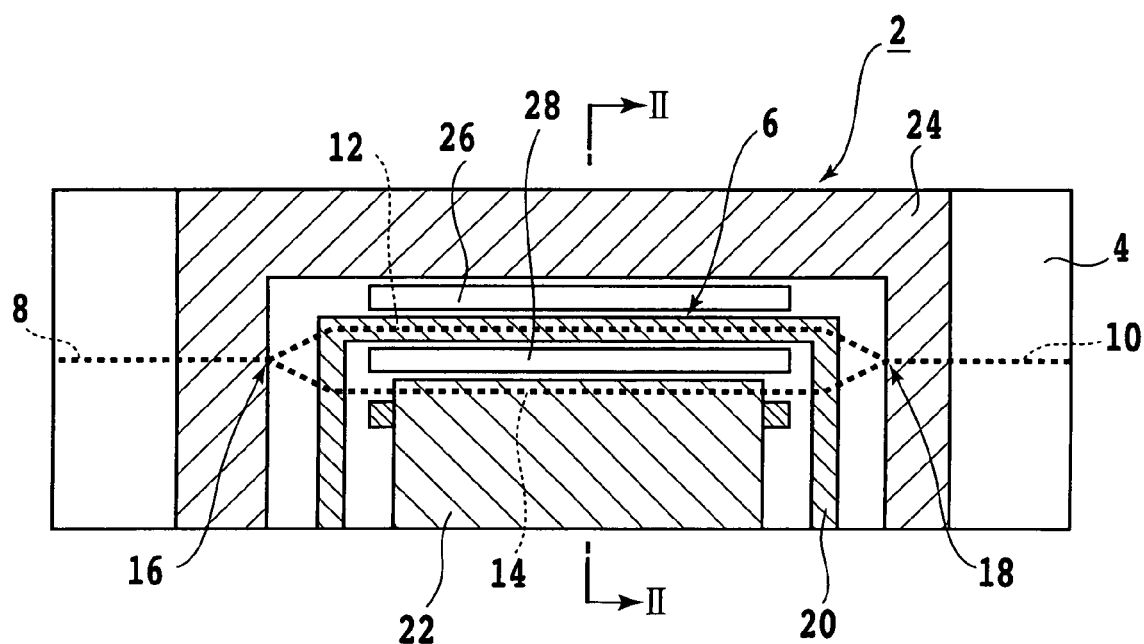
FIG. 1 is a plan view of an optical modulator according to a preferred embodiment of the present invention.
Figure 2:
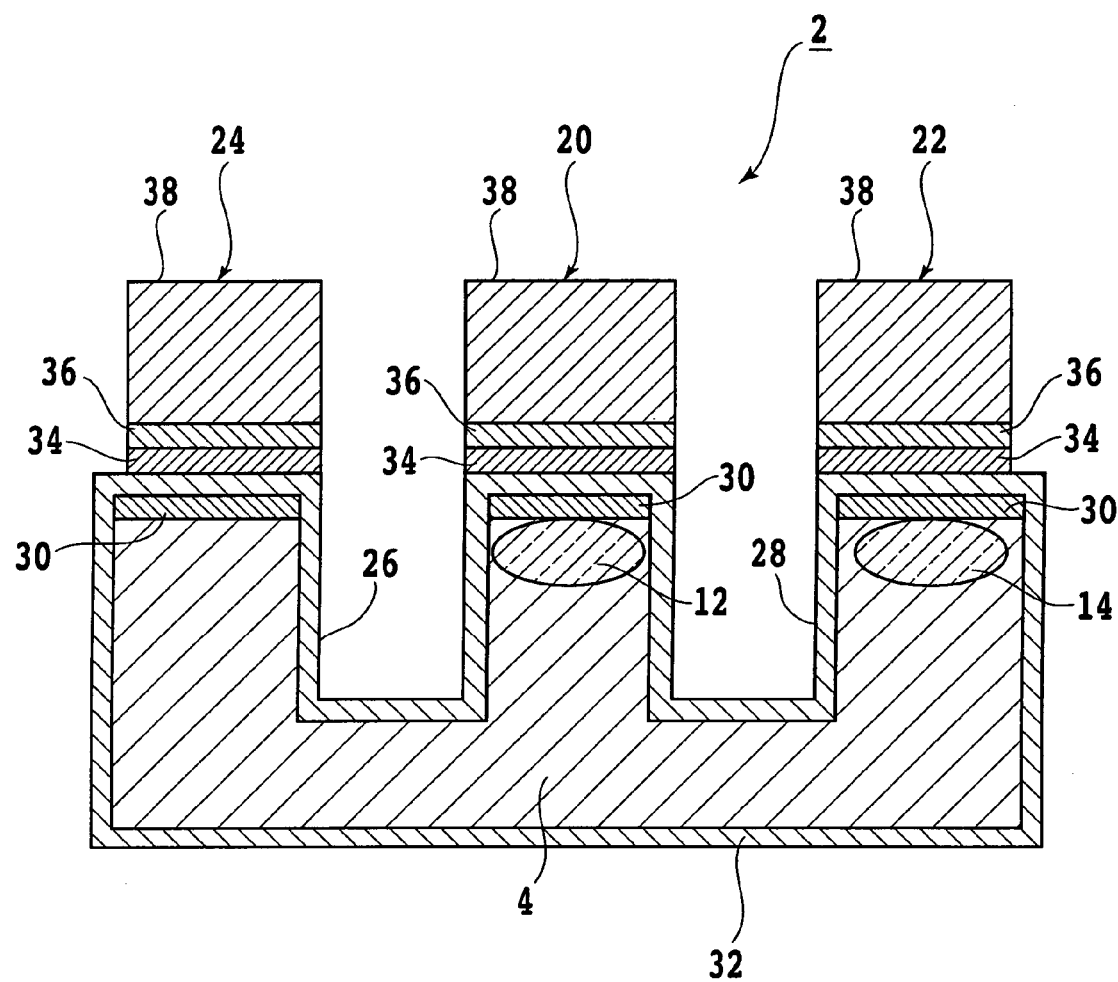
FIG. 2 is a cross section taken along the line II—II in FIG. 1.

FIG. 1 is a plan view of a Mach-Zehnder type optical modulator 2 manufactured by the manufacturing method according to the present invention. FIG. 2 is a schematic cross section taken along the line II—II in FIG. 1, wherein the dimensional ratios are exaggerated for illustration. The optical modulator or optical modulator chip 2 is formed of a dielectric having an electro-optic effect. For example, the optical modulator 2 is formed from a lithium niobate substrate (LiNbO$_3$ substrate) 4. The optical modulator 2 has a Mach-Zehnder type optical waveguide structure 6. The optical waveguide structure 6 is composed of an input optical waveguide 8, an output optical waveguide 10, and first and second optical waveguides 12 and 14 extending between the input optical waveguide 8 and the output optical waveguide 10.

The first and second optical waveguides 12 and 14 are connected through a Y branch 16 to the input optical waveguide 8 and also connected through a Y branch 18 to the output optical waveguide 10. The optical waveguide structure 6 is formed by thermally diffusing titanium (Ti) in the LiNbO$_3$ substrate 4. Signal light supplied to the input optical waveguide 8 is substantially equally divided in optical power into two components, and these two components are guided by the first and second optical waveguides 12 and 14, respectively. These guided optical components are coupled through the Y branch 18 to the output optical waveguide 10. Switching is made between a coupled mode where light is guided in the output optical waveguide 10 and a radiation mode (leaky mode) where light is radiated from the Y branch 18 into the substrate 4 according to a phase difference of light guided in the first and second optical waveguides 12 and 14.

A signal electrode (traveling wave electrode) 20 is provided over the first optical waveguide 12 and a grounding electrode 22 is provided over the second optical waveguide 14, so as to change the phase between signal lights branched. Further, another grounding electrode 24 is formed on the substrate 4 opposite to the grounding electrode 22 with respect to the first optical waveguide 12. A groove 26 having a depth of several micrometers is formed on the substrate 4 between the signal electrode 20 and the grounding electrode 24 so as to extend along the first optical waveguide 12. Similarly, a groove 28 having a depth of several micrometers is formed on the substrate 4 between the signal electrode 20 and the grounding electrode 22 so as to extend along the second optical waveguide 14. These grooves 26 and 28 are formed for the purposes of reducing a propagation loss and ensuring a high-frequency band characteristic.

A sectional structure of the optical modulator 2 will now be described with reference to FIG. 2. An $SiO_2$ buffer layer 30 is formed on the substrate 4 except the grooves 26 and 28. The entire surface of the substrate 4 including the inner surfaces of the grooves 26 and 28 is covered with an Si film 32. A Ti film 34 is formed on the Si film 32 by vacuum evaporation, and an Au film 36 is formed on the Ti film 34 by vacuum evaporation. Further, an Au plating 38 is formed on the Au film 36. The signal electrode 20 and the grounding electrodes 22 and 24 are formed by the Au plating 38. Each of these electrodes 20, 22, and 24 has a thickness of about 30 µm.

Figure 3A:
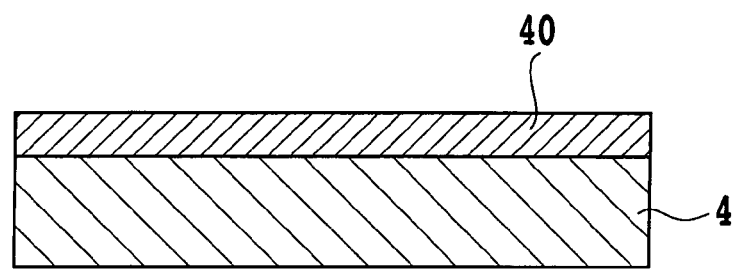
FIGS. 3A to 3N and 3P to 3U are sectional views for illustrating a manufacturing method according to a preferred embodiment of the present invention.
Figure 3B:
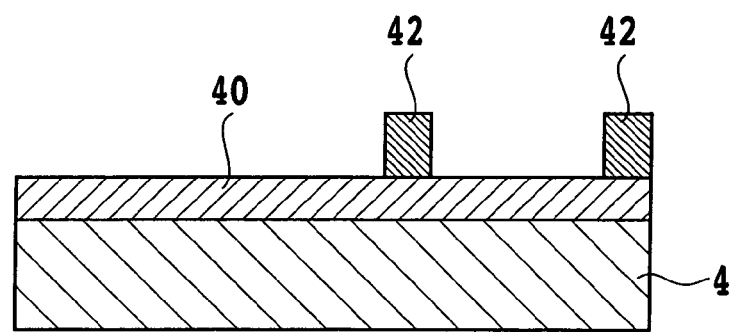
Figure 3C:
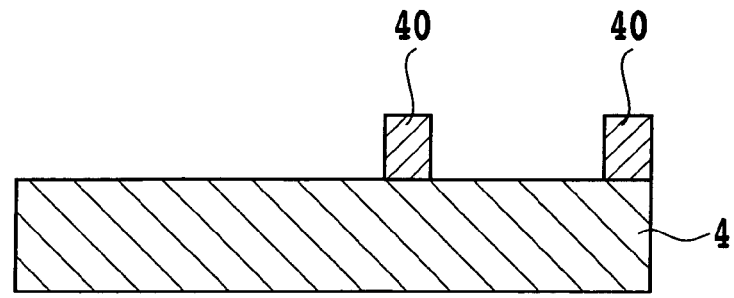

There will now be described a fabrication process for an optical modulator as an example of the manufacturing method for the optical waveguide device according to the present invention. As shown in FIG. 3A, a Ti film 40 having a thickness of about 100 nm is formed by vacuum evaporation on a $LiNbO_3$ substrate (LN substrate) 4. The Ti film 40 has a purity of 99.99%. Next, a photoresist 42 having a thickness of about 1 µm is applied to the Ti film 40, and then patterned as shown in FIG. 3B. Next, the Ti film 40 is etched by wet etching with the photoresist 42 used as a mask. After ending this etching, the photoresist 42 is removed by ultrasonic cleaning with acetone or the like, thereby obtaining a pattern of the Ti film 40 as shown in FIG. 3C.

Figure 3D:
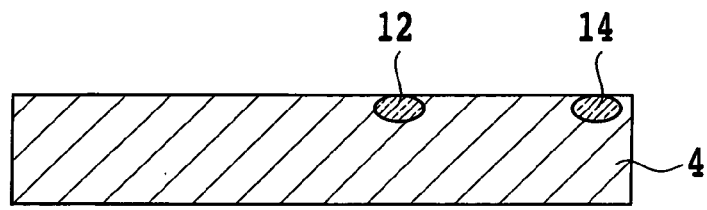
Figure 3E:
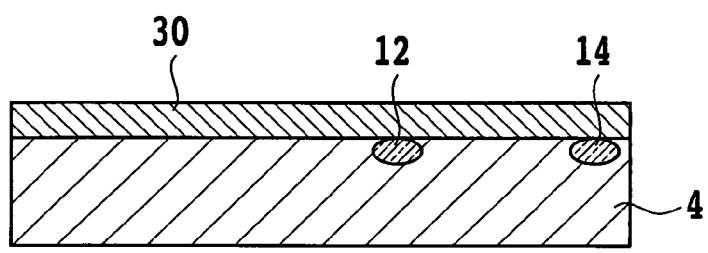
Figure 3F:
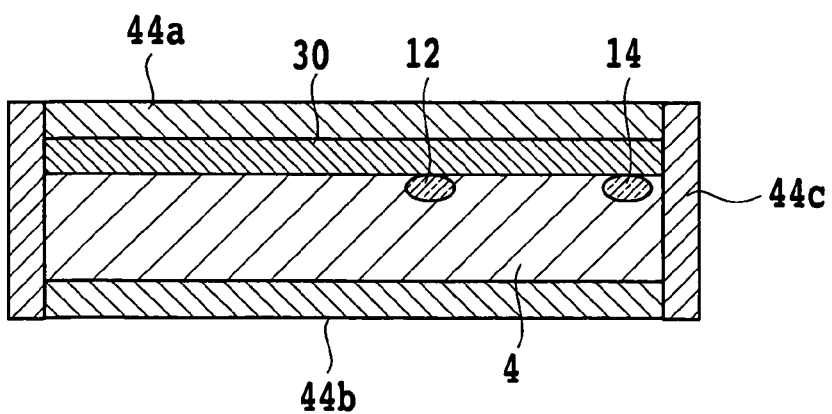

In the next step, thermal diffusion of the Ti film 40 into the substrate 4 is performed at a temperature of about 1000° C. for about 10 hours as passing pure oxygen as a carrier gas at a flow rate of about 10 liters/min, thereby forming optical waveguides 12 and 14 in the upper surface of the substrate 4 as shown in FIG. 3D. As shown in FIG. 3E, an $SiO_2$ buffer layer 30 having a thickness of about 1 µm is next formed. As shown in FIG. 3F, Si films 44a, 44b, and 44c each having a thickness of about 0.1 µm are formed on the buffer layer 30, the lower surface of the substrate 4, and the opposite side surfaces of the substrate 4, respectively. The deposition of these Si films 44a, 44b, and 44c is performed by a DC sputter device using Ar as a carrier gas at a deposition pressure of 0.66 Pa.

While the Si film 44c is formed on the opposite side surfaces of the substrate 4 in this preferred embodiment, it is sufficient that the Si film 44c may be formed on at least a part of either side surface of the substrate 4 so as to make a conduction between the Si film 44a formed on the $SiO_2$ buffer layer 30 and the Si film 44b formed on the lower surface of the substrate 4. Since the upper and lower surfaces of the substrate 4 are covered with the Si films 44a and 44b, and these Si films 44a and 44b are connected with each other through the Si film 44c formed on the opposite side surfaces of the substrate 4, it is possible to suppress polarization of the LN substrate 4 due to temperature fluctuations, thereby preventing charging of the LN substrate 4 at a high voltage.

Figure 3G:
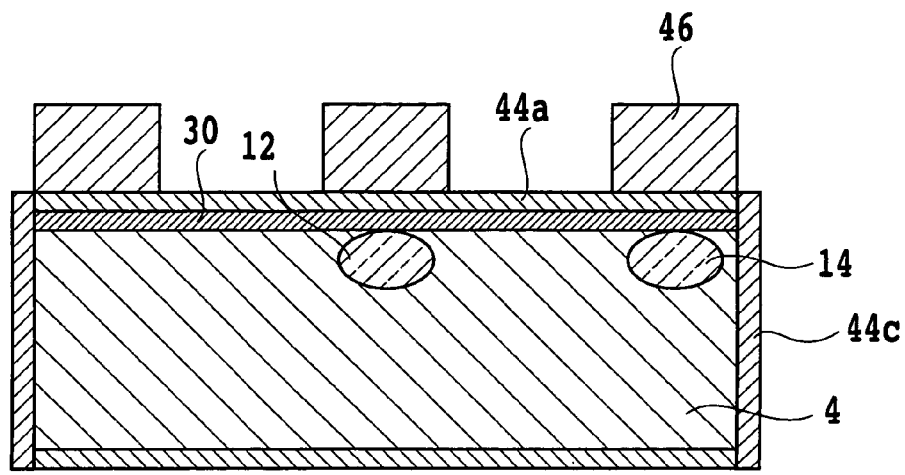
Figure 3H:
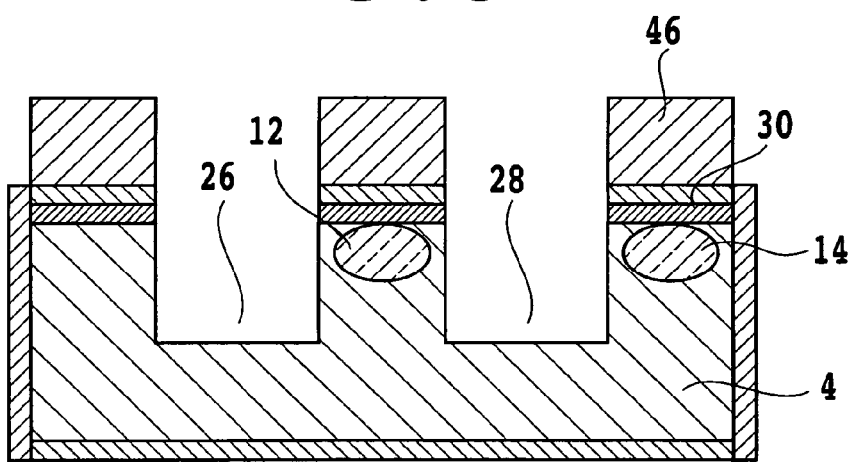
Figure 3I:
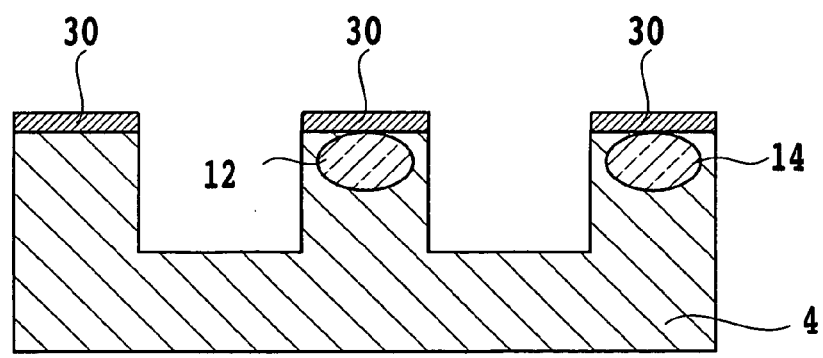

In the next step, a photoresist 46 is applied to the Si film 44a and thereafter patterned for RIE dry etching as shown in FIG. 3G. Then, RIE (reactive ion etching) is performed by using an RIE dry etching device shown in FIG. 4 to thereby form a pair of grooves 26 and 28 each having a depth of several micrometers and extending along the optical waveguides 12 and 14 (FIG. 3H). As shown in FIG. 3I, the photoresist 46 and the Si films 44a, 44b, and 44c are removed by using a removing liquid (e.g., DE-3, a trade name manufactured by Tokyo Ohka Kogyo Co., Ltd.).

Figure 4:
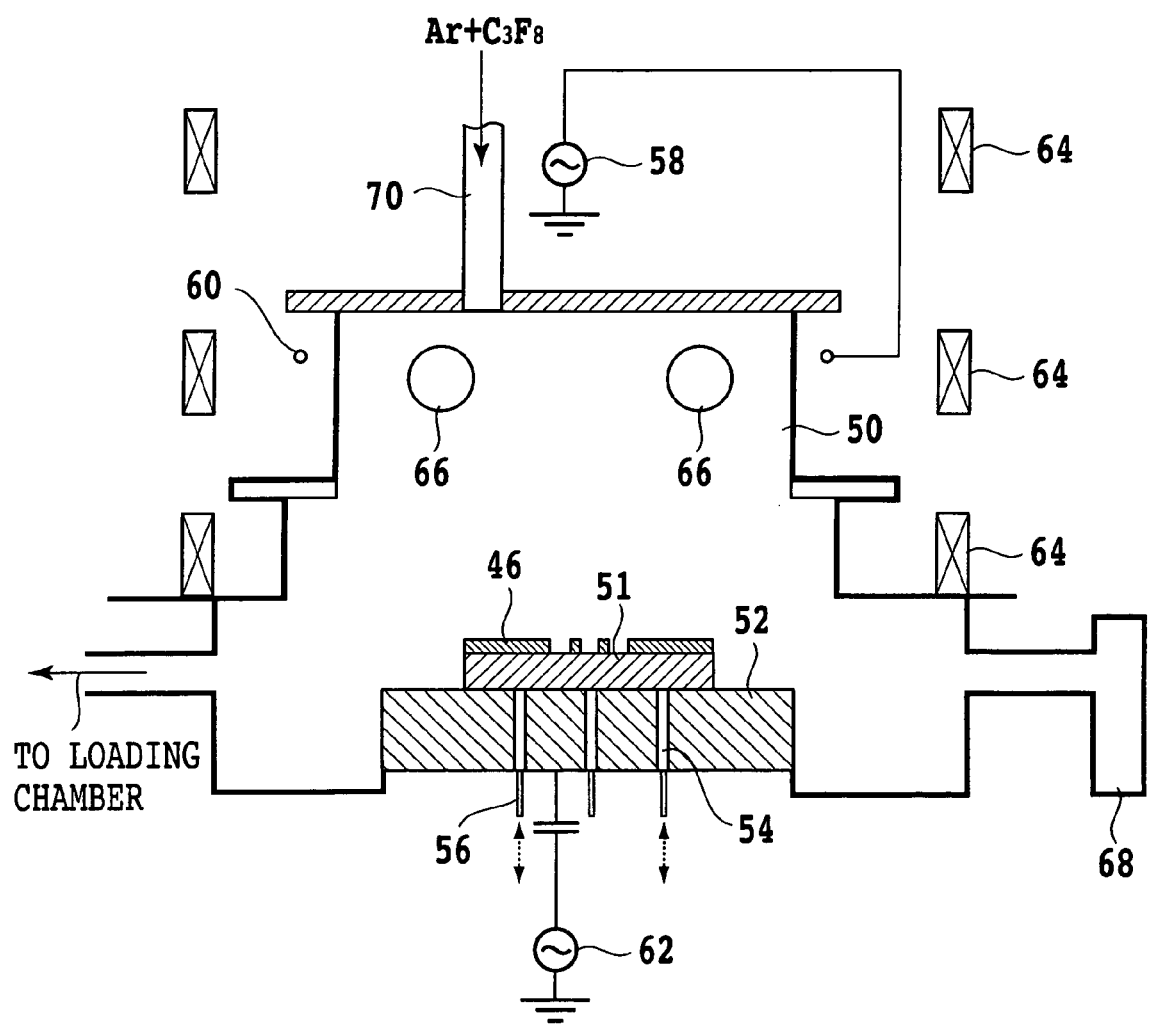
FIG. 4 is a schematic view showing the configuration of an RIE dry etching device.

The RIE dry etching device used herein will now be described with reference to FIG. 4. The RIE dry etching device has an etching chamber 50 and a loading chamber (load lock chamber) (not shown), wherein an LN wafer 51 is automatically transferred between the etching chamber 50 and the loading chamber by means of a transfer device. Reference numeral 52 denotes a stage formed of aluminum. The stage 52 is connected to a bias high-frequency power supply 62 and functions as an electrode. The stage 52 is formed with a plurality of holes 54 serving both as He gas supply holes and as insertion holes for hoist pins 56. Reference numeral 58 denotes a high-frequency power supply for forming a plasma. The high-frequency power supply 58 is connected to a high-frequency antenna 60. Reference numerals 64 and 66 denote a magnetically neutral linear coil and a magnetically neutral discharging portion, respectively. The etching chamber 50 is connected to a vacuum pump 68, so that the etching chamber 50 is maintained under a given vacuum by the vacuum pump 68 during RIE.

The operation of this RIE device will now be described. First, the wafer 51 is set on a pan for a wafer handler in the loading chamber. When an operation control button is depressed, the wafer 51 is automatically transferred from the loading chamber to the etching chamber 50 by the transfer device. In the etching chamber 50, the wafer 51 placed on the stage 52 is raised by the hoist pins 56 operated to project upward from the lower side of the stage 52, and the pan for the wafer handler is returned to the loading chamber by the transfer device. Thereafter, the hoist pins 56 are lowered to set the wafer 51 on the stage 52.

A mixed gas of Ar and $C_3F_8$ as an etching gas is supplied from a supply pipe 70 into the etching chamber 50, and an antenna power of 1200 W from the high-frequency power supply 58 and a bias power of 200 W from the bias power supply 62 are applied under a deposition pressure of 0.25 Pa to perform the reactive ion etching (RIE) of the wafer 51. The wafer 51 or the substrate 4 in this preferred embodiment has such a structure that the Si film 44a formed on the upper surface of the substrate 4 and the Si film 44b formed on the lower surface of the substrate 4 are connected with each other through the Si film 44c formed on the opposite side surfaces of the substrate 4 as shown in FIG. 3G. Accordingly, polarization of the wafer 51 or the substrate 4 can be prevented to thereby prevent charging of the wafer 51 or the substrate 4.

As a result, discharging from the wafer 51 can be prevented to thereby prevent the damage to the wafer 51 due to discharge shock. Further, since charging of the wafer 51 can be prevented, sticking of the wafer 51 to the stage 52 can be eliminated to thereby allow automatic transfer of the wafer 51. Further, since the Si film 44a is formed under the photoresist 46 in patterning exposure for dry etching, a sufficient luminance can be ensured to allow clear viewing of a marker formed on the wafer 51, so that alignment can be easily made in the patterning exposure.

After ending the etching, the wafer 51 is raised by the hoist pins 56, and next received by the pan for the wafer handler to automatically transfer the wafer 51 to the loading chamber by the transfer device. Thereafter, cleaning of the etching chamber 50 is performed. The interior of the etching chamber 50 is contaminated with the photoresist 46 removed from the wafer 51. Unless cleaning of the etching chamber 50 is performed, high-frequency discharge cannot be effected in the next cycle of the RIE operation, so that RIE cannot be performed.

The cleaning is performed in the following manner. A dummy wafer such as an Si wafer is placed on the wafer pan in the loading chamber, and this dummy wafer is automatically transferred to the etching chamber 50. Then, the cleaning is performed for a given time period in an atmosphere of oxygen gas containing a small amount of $CF_4$ under a vacuum of about 1.33 Pa at an antenna power of 1000 W and a bias power of 50 W. After ending the cleaning, the dummy wafer is automatically transferred to the loading chamber.

Figure 3J:
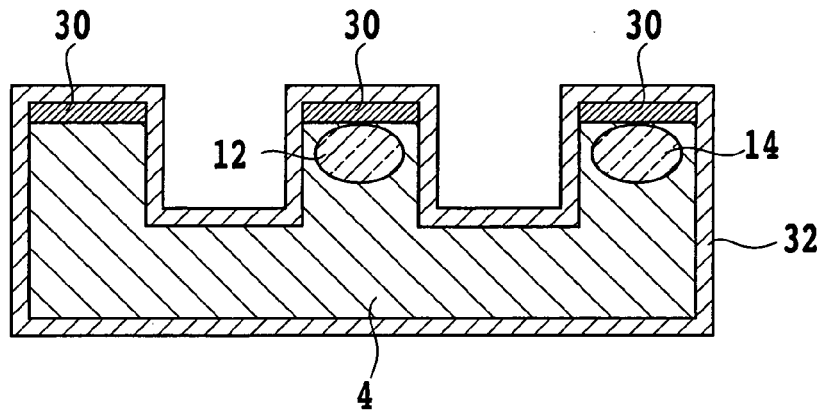
Figure 3K:
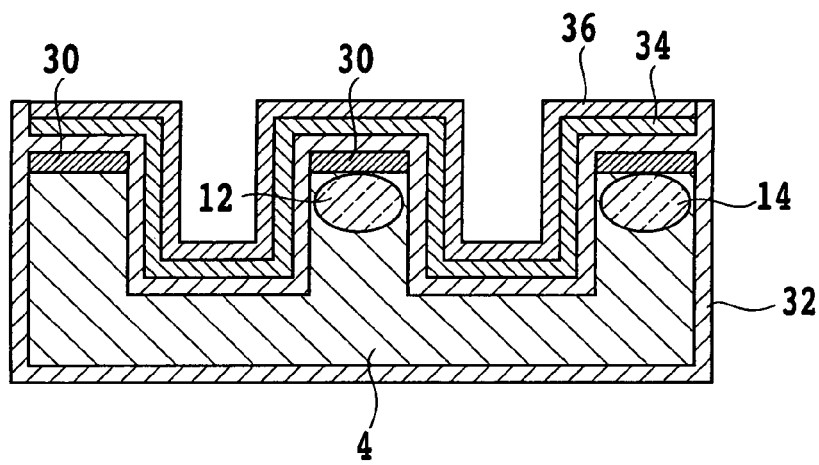

After ending the step shown in FIG. 3I, an Si film 32 having a thickness of about 0.1 μm is formed on the upper surface, the lower surface, and at least a part of the opposite side surfaces of the substrate 4 by a DC sputter device as shown in FIG. 3J. Thereafter, a Ti film 34 having a thickness of about 50 nm and an Au film 36 having a thickness of about 200 nm are sequentially formed by vacuum evaporation under a vacuum of $6.6 \times 10^{-4}$ Pa as shown in FIG. 3K. The Ti film 34 has a purity of 99.99%, and the Au film 36 has a purity of 99.99% or more.

Figure 3L:
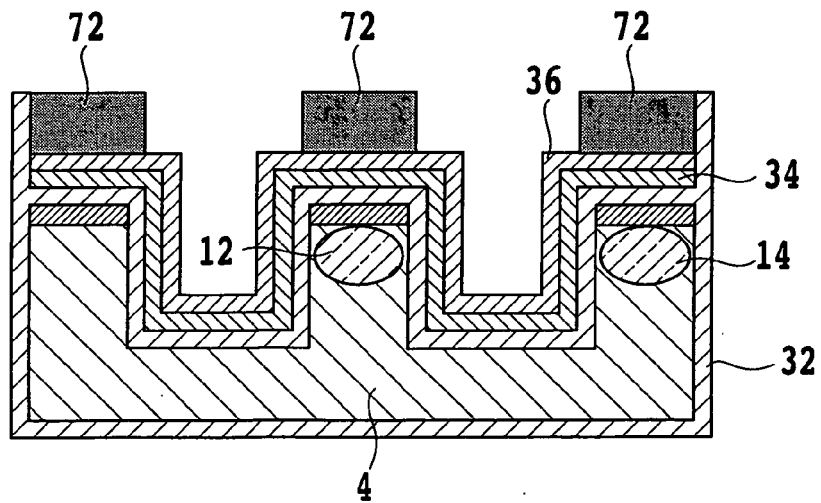
Figure 3M:
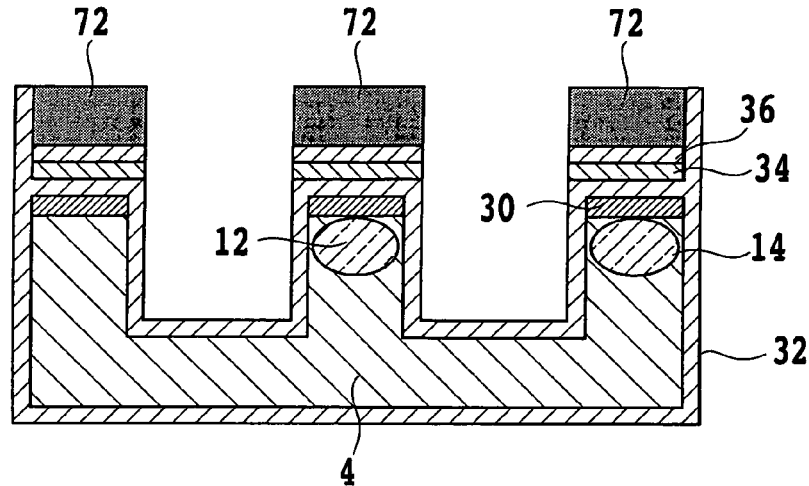
Figure 3N:
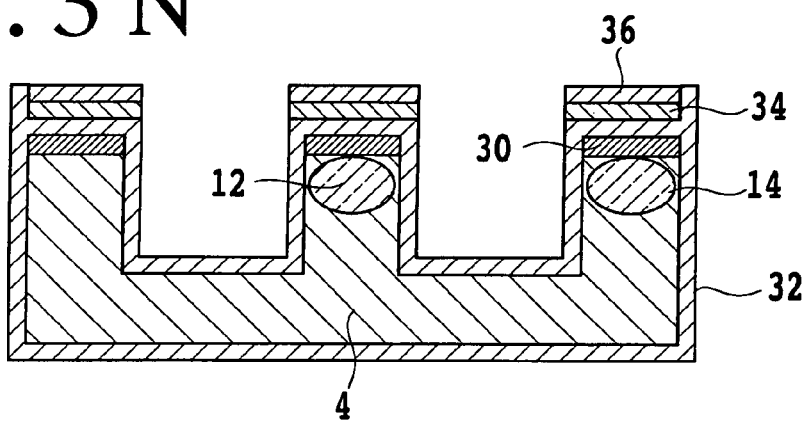
Figure 3P:
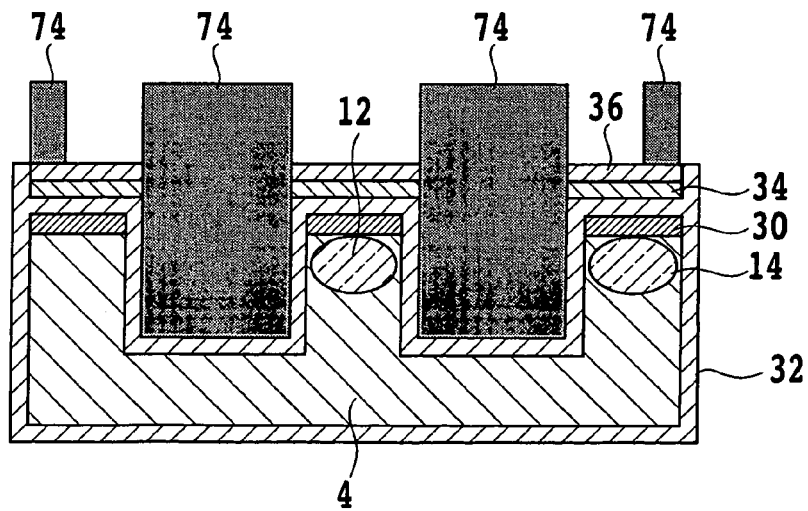

Thereafter, a photoresist 72 is applied with a thickness of about 13 μm on the Au film 36, and then patterned as shown in FIG. 3L. Next, the Ti film 34 and the Au film 36 are etched by using an etching liquid as shown in FIG. 3M. After this etching, the photoresist 72 is removed by ultrasonic cleaning with acetone or the like (FIG. 3N). Thereafter, a photoresist 74 for an Au plating is applied with a thickness of about 32 μm, and then patterned as shown in FIG. 3P.

Figure 3Q:
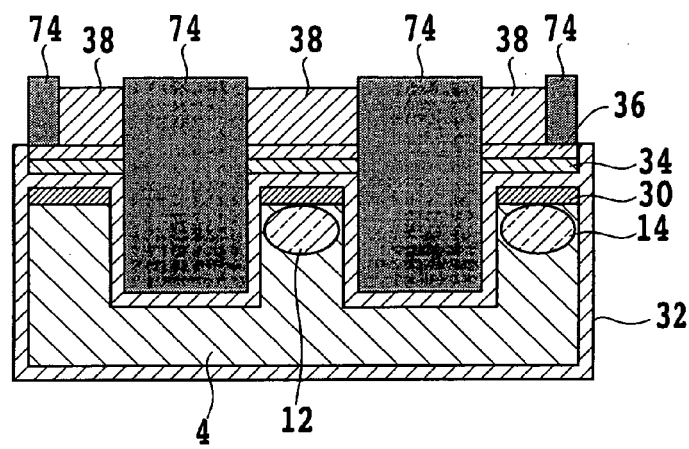
Figure 3R:
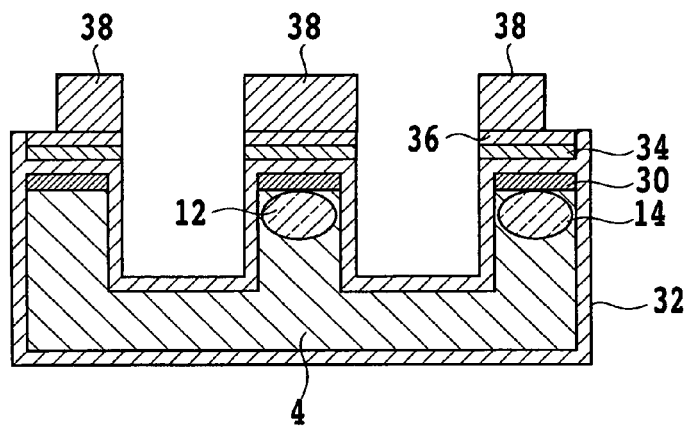
Figure 3S:
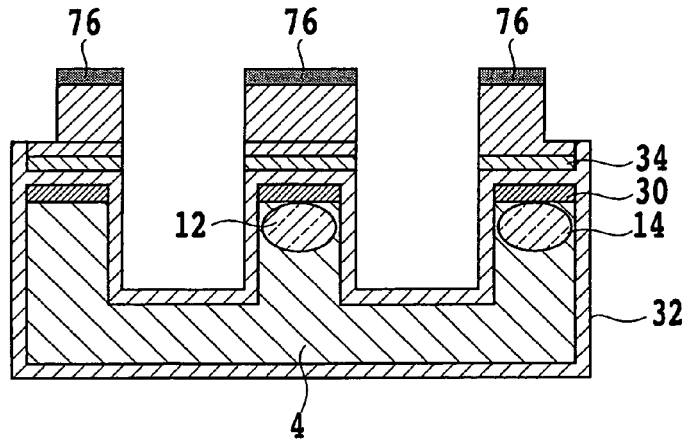
Figure 3T:
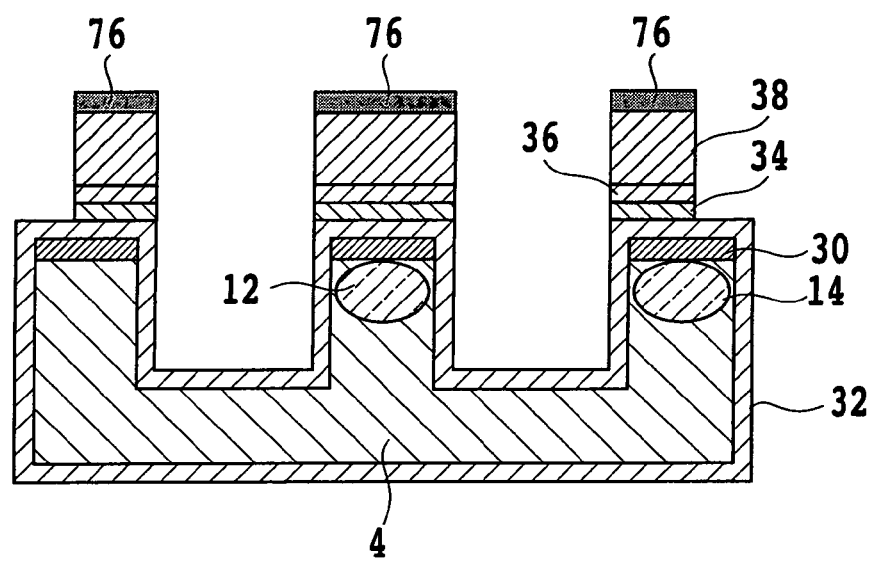
Figure 3U:
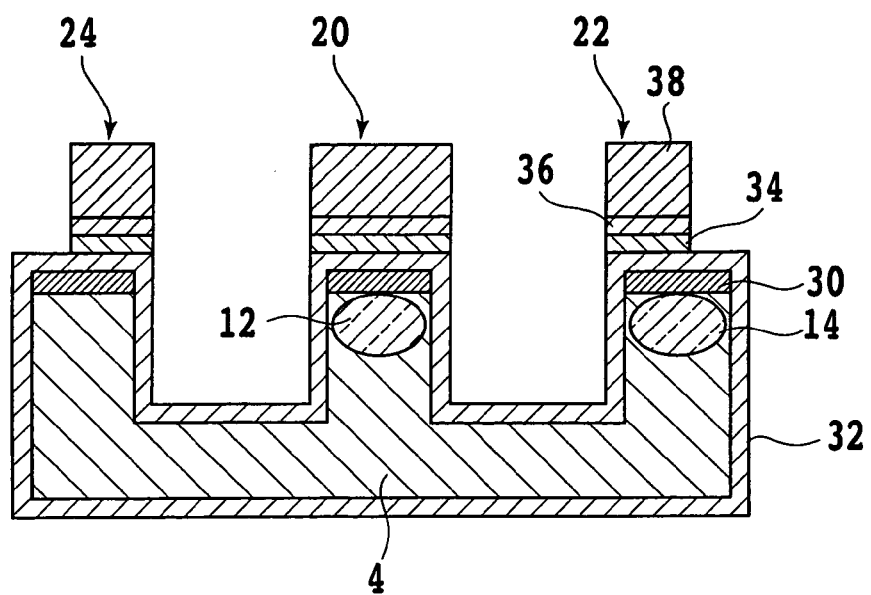

Thereafter, an Au plating 38 having a thickness of about 30 μm is formed as shown in FIG. 3Q, and the photoresist 74 is next removed by ultrasonic cleaning with acetone or the like (FIG. 3R). Thereafter, a photoresist 76 for etching of an unwanted portion of the Ti film 34 and the Au film 36 is applied and next patterned as shown in FIG. 3S. Then, the unwanted portion of the Ti film 34 and the Au film 36 is removed by wet etching as shown in FIG. 3T, and the photoresist 76 is next removed by ultrasonic cleaning with acetone or the like (FIG. 3U). As a result, given electrode shapes 20, 22, and 24 can be obtained.

Figure 5A:
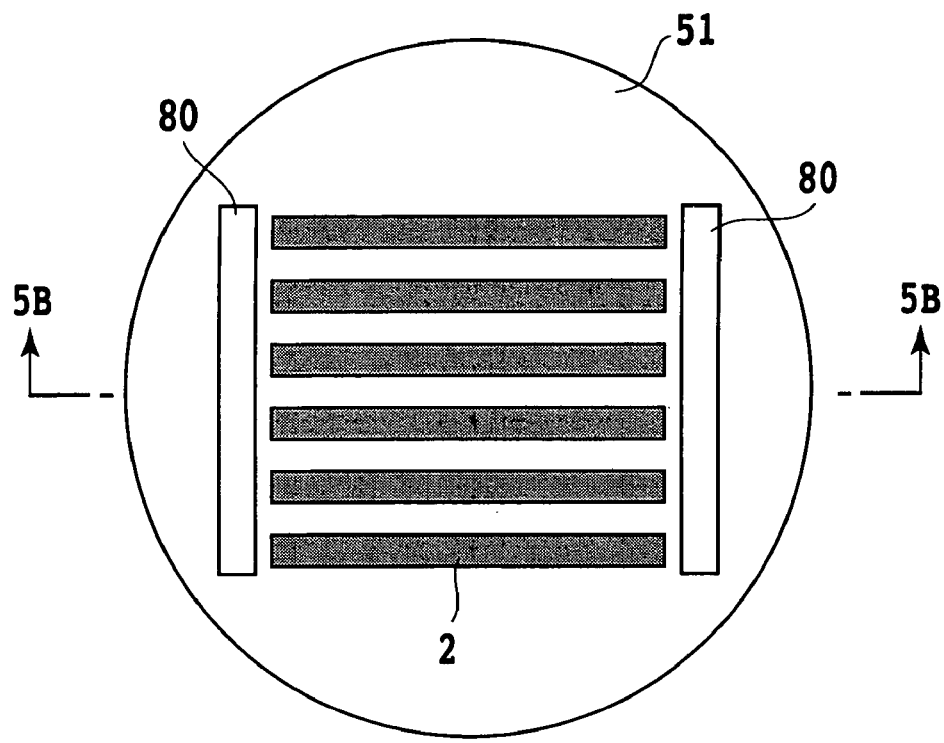
FIG. 5A is a plan view showing a condition where a pair of protective members are bonded to a wafer.
Figure 5B:
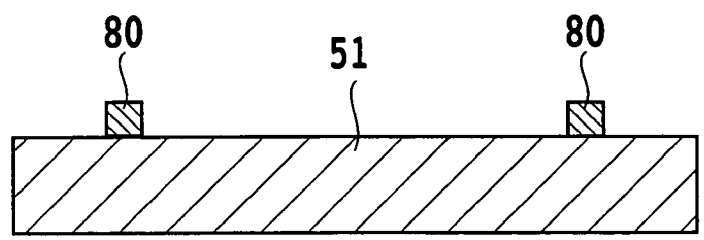
FIG. 5B is a cross section taken along the line 5B—5B in FIG. 5A.

The above steps shown in FIGS. 3A to 3U are carried out to thereby allow the formation of a plurality of optical modulators 2 on the LN wafer 51. In the next step, a pair of protective members (auxiliary appliances) 80 are bonded to the LN wafer 51 at positions near the opposite ends of the plural optical modulators 2 formed on the LN wafer 51 as shown in FIGS. 5A and 5B. These protective members 80 serve to protect the end surfaces of each optical modulator 2.

Figure 6:
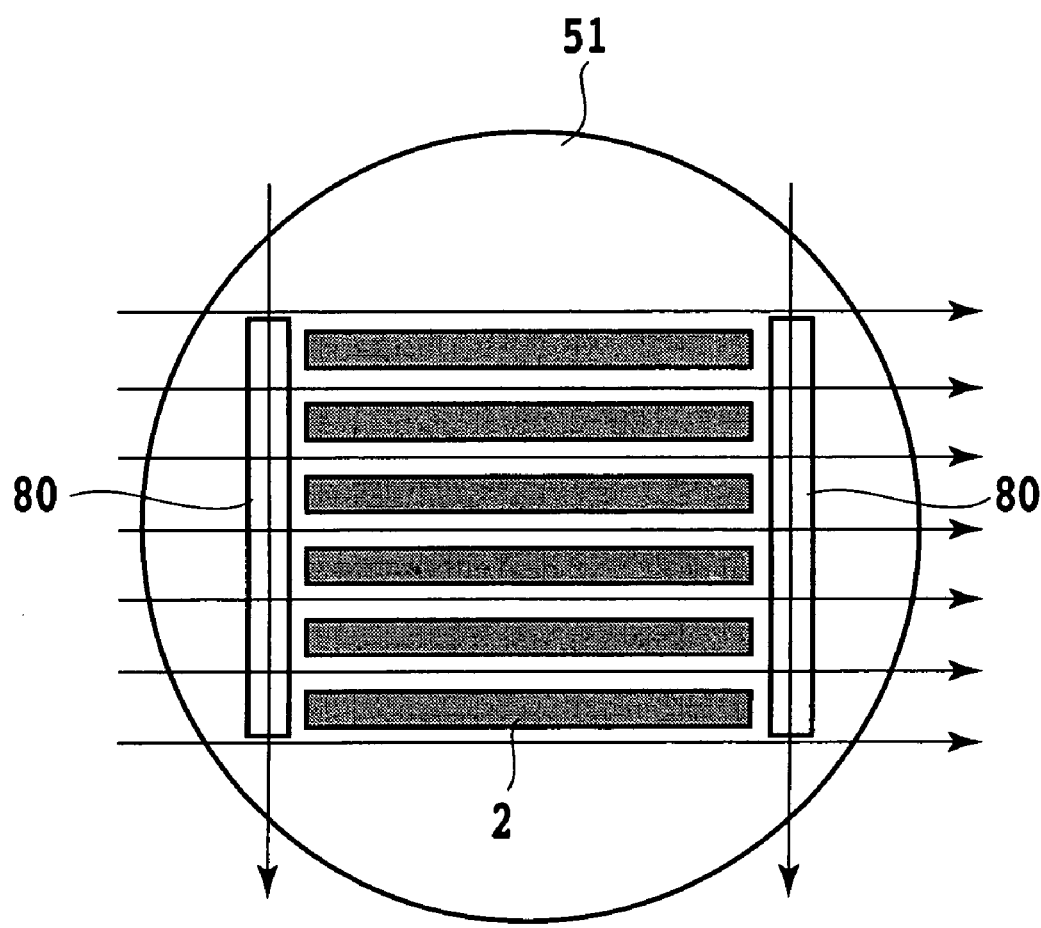
FIG. 6 is a plan view showing a dicing step.

Thereafter, dicing by a rotary resin diamond blade is performed to individually cut the optical modulator chips 2 from the LN wafer 51 as shown in FIG. 6. An Si film is formed on the side surfaces of each optical modulator chip 2 to electrically connect the Si films 32 formed on the upper and lower surfaces of the substrate 4 in the step of FIG. 3J. Finally, an antireflection film is formed by vacuum evaporation on the end surfaces of each optical modulator chip 2, thus completing each optical modulator chip 2.

While the Si films 44a, 44b, and 44c are formed on the upper, lower, and side surfaces of the substrate 4, respectively, in the step of FIG. 3F in this preferred embodiment, the Si films 44a, 44b, and 44c may be replaced by Ti deposited films formed by vacuum evaporation. Further, a conductive photoresist is preferably used as the photoresist 46 in the step of FIG. 3G, so as to prevent charging of the upper surface of the substrate 4 or the wafer 51.

While the manufacturing method according to the present invention has been applied to a manufacturing method for an optical modulator in this preferred embodiment, the present invention is not limited to the above preferred embodiment, but it is also applicable to a manufacturing method for any other optical waveguide devices such as an optical demultiplexer, optical switch, and optical wavelength converter.

According to the manufacturing method for the optical waveguide device of the present invention, the Si films are formed on the entire upper surface, the entire lower surface, and at least a part of the side surface of the LN wafer prior to the dry etching (RIE) step. Accordingly, charging of the LN wafer can be prevented to thereby eliminate the damage to the wafer due to discharging at a high voltage, thus improving the manufacturing yield. Further, since charging of the LN wafer can be prevented, sticking of the wafer to the stage in the RIE step can be eliminated to thereby allow automatic transfer of the wafer.

Moreover, it is unnecessary to disassemble the etching chamber and thereafter reassemble it, so that the working efficiency can be greatly improved. Further, since the Si film is formed under the photoresist in patterning exposure for dry etching, a sufficient luminance can be ensured to allow clear viewing of a marker formed on the wafer, so that alignment can be easily made in the patterning exposure.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A manufacturing method for an optical waveguide device, comprising:
    forming an optical waveguide in a substrate having an electro-optic effect, said substrate having upper, lower, and side surfaces;
    forming an $SiO_2$ film on said substrate;
    forming silicon (Si) films on said $SiO_2$ film, the lower surface of said substrate, and at least a part of the side surface of said substrate to thereby make a conduction between said Si films formed on said $SiO_2$ film and said Si films formed on the lower surface of said substrate;
    applying a photoresist to said Si films formed on said $SiO_2$ film;
    patterning said photoresist so that a portion of said photoresist corresponding to said optical waveguide is left attached on said Si films;
    forming a groove on said substrate along said optical waveguide by reactive ion etching; and
    removing said photoresist and said Si films.

2. The manufacturing method according to claim 1, wherein said substrate comprises a $LiNbO_3$ substrate, and forming said optical waveguide comprises thermally diffusing titanium (Ti) in said $LiNbO_3$ substrate.

3. The manufacturing method according to claim 1, wherein said forming said Si films is performed by sputtering.

4. The manufacturing method according to claim 1, wherein said photoresist comprises a conductive photoresist.

* * * * *